(12) United States Patent
Claire-Zimmet et al.

(10) Patent No.: US 12,376,949 B2
(45) Date of Patent: *Aug. 5, 2025

(54) BRISTLE DRIVEN PULSATION

(71) Applicant: Braun GmbH, Kronberg (DE)

(72) Inventors: Karen Lynn Claire-Zimmet, Kronberg (DE); Niclas Altmann, Niddatal (DE); Thomas Fritsch, Eppstein (DE); Norbert Schaefer, Frankfurt Am Main (DE)

(73) Assignee: Braun GmbH, Kronberg (DE)

( * ) Notice: Subject to any disclaimer, the term of this patent is extended or adjusted under 35 U.S.C. 154(b) by 870 days.

This patent is subject to a terminal disclaimer.

(21) Appl. No.: 16/878,330

(22) Filed: May 19, 2020

(65) Prior Publication Data

US 2020/0367638 A1 Nov. 26, 2020

Related U.S. Application Data

(60) Provisional application No. 62/850,303, filed on May 20, 2019.

(51) Int. Cl.
*A61C 17/34* (2006.01)
*A46B 13/02* (2006.01)
(Continued)

(52) U.S. Cl.
CPC ........ *A61C 17/3436* (2013.01); *A46B 13/023* (2013.01); *A46B 15/0012* (2013.01);
(Continued)

(58) Field of Classification Search
CPC ............ A61C 17/3481; A61C 17/3436; A61C 17/3463; A61C 17/3472; A61C 17/26; A46B 15/0012; A46B 13/023
See application file for complete search history.

(56) References Cited

U.S. PATENT DOCUMENTS

| 4,698,869 | A | | 10/1987 | Mierau |
| 5,263,218 | A | * | 11/1993 | Giuliani ............ A61C 17/3463 310/36 |

(Continued)

FOREIGN PATENT DOCUMENTS

| CN | 1582135 A | 2/2005 |
| JP | H0511829 U | 2/1993 |
| JP | H05154015 A | 6/1993 |

OTHER PUBLICATIONS

PCT Search Report and Written Opinion for PCT/IB2020/054737 dated Aug. 28, 2020, 12 pages.

(Continued)

*Primary Examiner* — Laura C Guidotti
(74) *Attorney, Agent, or Firm* — Jay A. Krebs

(57) ABSTRACT

An electric toothbrush having bristle driven pulsation includes a brush head having a bristle holder and bristle tufts attached to the bristle holder. The bristle tufts and corresponding bristles are disposed at a perpendicular and/or a non-perpendicular angle with respect to a mounting surface of the brush head. The electric toothbrush also includes an electric toothbrush handle removably attached to the brush head. The electric toothbrush handle includes a linear motor configured to drive the bristle holder via a gearing structure coupled to the linear motor and the bristle holder. The linear motor causes the bristle holder to rotate clockwise and counterclockwise at a rotation frequency which exceeds a rotation frequency threshold (e.g., 100 Hz, 120 Hz, etc.). The linear motor also causes the brush head to vibrate in a direction toward and away from a contact surface in synchronization with the rotation of the bristles.

18 Claims, 12 Drawing Sheets

| Brush Head Type | View | Rotation/Head Movement | | | |
| --- | --- | --- | --- | --- | --- |
| | | Partial Turn Left ⇐ | Full Turn Left ⇐ | Partial Turn Right ⇒ | Full Turn Right ⇒ |
| Brush Head A Angled Filaments, More Dense/More Filaments | | Larger up ⇧ | Larger down ⇩ | None | Smaller up/down ⇧⇩ |
| Brush Head B Straight Filaments, More Dense/More Filaments | | Smaller up ⇧ | Smaller down ⇩ | Smaller up ⇧ | Smaller down ⇩ |
| Brush Head C Angled Filaments, Less Dense/Fewer Filaments | | Smaller up ⇧ | Smaller down ⇩ | None | None |

400

(51) Int. Cl.
*A46B 15/00* (2006.01)
*A61C 17/26* (2006.01)
*A46B 9/02* (2006.01)

(52) U.S. Cl.
CPC .......... *A46B 15/0044* (2013.01); *A61C 17/26* (2013.01); *A61C 17/3472* (2013.01); *A61C 17/3481* (2013.01); *A46B 9/025* (2013.01); *A46B 15/0008* (2013.01); *A46B 2200/1066* (2013.01)

(56) References Cited

U.S. PATENT DOCUMENTS

| | | | |
|---|---|---|---|
| 5,289,604 | A | 3/1994 | Kressner |
| 5,311,633 | A | 5/1994 | Herzog |
| 5,577,285 | A | 11/1996 | Droessler |
| 5,613,259 | A | 3/1997 | Craft et al. |
| 5,930,858 | A | 8/1999 | Jung |
| 5,943,723 | A | 8/1999 | Hilfinger |
| 5,974,615 | A | 11/1999 | Schwarz-hartmann |
| 6,058,541 | A | 5/2000 | Masterman |
| 6,363,565 | B1 * | 4/2002 | Paffrath ............... A61C 15/047 15/28 |
| 6,648,641 | B1 | 11/2003 | Viltro |
| 7,392,562 | B2 * | 7/2008 | Boland .................... A46B 7/06 15/22.4 |
| 8,782,841 | B2 * | 7/2014 | Sale ..................... A61C 17/222 15/22.1 |
| 9,089,390 | B2 * | 7/2015 | Klemm .............. A61C 17/3472 |
| 9,364,303 | B2 * | 6/2016 | Driesen ................ A61C 17/222 |
| 10,010,390 | B2 * | 7/2018 | Fritsch ................. A61C 17/222 |
| 2002/0129454 | A1 | 9/2002 | Hilscher |
| 2002/0138926 | A1 | 10/2002 | Brown et al. |
| 2003/0074751 | A1 | 4/2003 | Wu |
| 2003/0101526 | A1 | 6/2003 | Hilscher |
| 2003/0131427 | A1 | 7/2003 | Hilscher et al. |
| 2003/0154567 | A1 | 8/2003 | Drossler |
| 2003/0163881 | A1 | 9/2003 | Driesen et al. |
| 2004/0154112 | A1 | 8/2004 | Braun |
| 2005/0000044 | A1 | 1/2005 | Hilscher |
| 2005/0008050 | A1 | 1/2005 | Fischer |
| 2005/0050658 | A1 | 3/2005 | Chan |
| 2005/0050659 | A1 | 3/2005 | Chan |
| 2005/0053895 | A1 | 3/2005 | Pinyayev |
| 2005/0066459 | A1 | 3/2005 | Pinyayev |
| 2005/0235439 | A1 | 10/2005 | Braun |
| 2006/0248667 | A1 | 11/2006 | Kraemer |
| 2012/0036658 | A1 * | 2/2012 | Schaefer .............. A61C 17/222 15/28 |
| 2013/0007969 | A1 | 1/2013 | Driesen et al. |
| 2014/0015346 | A1 | 1/2014 | Schober et al. |
| 2017/0194849 | A1 | 7/2017 | Meginniss, III et al. |
| 2018/0019650 | A1 | 1/2018 | Schober et al. |
| 2019/0125068 | A1 | 5/2019 | Schaefer et al. |
| 2020/0368003 | A1 * | 11/2020 | Claire-Zimmet .... A46B 13/023 |

OTHER PUBLICATIONS

EP Office Action; Application Ser. No. 20729193.1, mailed on Feb. 14, 2024, 05 Pages.

All Office Actions, U.S. Appl. No. 16/878,407, filed on May 19, 2020.

* cited by examiner

| Brush Head Type | View | Rotation/Head Movement | | | |
|---|---|---|---|---|---|
| | | Partial Turn Left ⇓ | Full Turn Left ⇓ | Partial Turn Right ⇑ | Full Turn Right ⇑ |
| Brush Head A Angled Filaments, More Dense/More Filaments | | Larger up ⇐ | Larger down ⇒ | None | Smaller up/down ⇔ |
| Brush Head B Straight Filaments, More Dense/More Filaments | | Smaller up ⇐ | Smaller down ⇒ | Smaller up ⇐ | Smaller down ⇒ |
| Brush Head C Angled Filaments, Less Dense/Fewer Filaments | | Smaller up ⇐ | Smaller down ⇒ | None | None |

FIG. 4

BRISTLE DRIVEN PULSATION

TECHNICAL FIELD

The present disclosure generally relates to electric toothbrush systems, and, more particularly, to vibration of the brush head synchronized with rotation of the bristles.

BACKGROUND

Typically, an electric toothbrush has a toothbrush head, a toothbrush neck, and a toothbrush handle. The brush head includes a movable bristle holder with a flat surface which includes single or multiple tufts of bristles. A motor in the toothbrush handle controls movement of the bristle holder, causing the bristles to move up and down, side to side, in a circular movement pattern, etc.

However, as the bristles move, the toothbrush head, neck, or handle may also vibrate for example, via the hard plastic of the brush head or neck. These additional vibrations, via the hard plastic, can be distracting and uncomfortable for the user. In some instances, the vibration of the brush head or neck is greater than the vibration from the movement of the bristles. Users have reported an uncomfortable feeling when accidentally making contact with the brush neck or the hard plastic of the brush head as it vibrates.

Furthermore, as the user applies additional force to the electric toothbrush the motion of the bristles has been known to decline from its original movement pattern. In some instances, the bristles collapse under the load with bristle motion significantly reduced.

SUMMARY

To synchronize vibration of the brush head with rotation of the bristles and remove unwanted vibration in the hard plastic of the brush head, neck or handle, an electric toothbrush includes several bristle tufts attached to a movable bristle holder on the brush head. Each bristle tuft includes several bristles, where the bristle tuft and the corresponding bristles may be disposed at perpendicular or non-perpendicular angles with respect to the mounting surface of the brush head (also referred to herein as "straight tufts" and "straight bristles" or "angled tufts" and "angled bristles"). The tufts may be disposed at any suitable angle and some tufts may be disposed at different angles than other tufts. Additionally, the tufts may be inclined or declined with respect to a line perpendicular to the mounting surface, may be angled to the right or the left with respect to the line perpendicular to the mounting surface, or may be angled in any suitable combination of an incline or a decline and to the right or to the left of the line perpendicular to the mounting surface.

Additionally, the electric toothbrush includes a motor such as a linear motor and a gearing structure coupled to the motor which rotates the tufts as the motor moves. The tufts are rotated back and forth by a predetermined angle of rotation (e.g., 28°, 33°, 45°, etc.) and at a particular rotation frequency which exceeds a threshold frequency (e.g., 100 Hz, 115 Hz, 130 Hz, 145 Hz, etc.). In some implementations, one rotation cycle or period may include a clockwise rotation, during a first time interval, from a first half of the predetermined angle of rotation (e.g., 14°, 16°, 22°, etc.) to a second half of the predetermined angle of rotation (e.g., −14°, −16°, −22°, etc.) and a counterclockwise rotation, during a second time interval, back to the first half of the predetermined angle of rotation (e.g., 14°, 16°, 22°, etc.). In other words, the time period corresponding to the rotation frequency includes a combination of the first time interval and the second time interval. Also in some implementations, the tufts may be rotated at a particular rotation frequency which is in a threshold frequency range (e.g., between 100 Hz and 200 Hz, between 100 Hz and 150 Hz, etc.).

As the angled tufts rotate in accordance with the movement of the linear motor and as the bristles make contact with a contact surface such as the surface of a user's teeth, the motion causes the bristles to bend/buckle, moving the brush head toward and away from the contact surface in a periodic manner leading to a micro-vibration (also referred to herein as a "bristle driven pulsation"). The micro-vibration amplitude increases as a force is applied to the contact surface which is at or above a threshold force (e.g., 0.8 N). Furthermore, the micro-vibration frequency is synchronized with the frequency of the rotation of the tufts. This provides a smoother brushing experience for the user and reduces the noise level of the electric toothbrush during the brushing period. Additionally, the micro-vibration amplitude is generated at and via bristles, not generated in the handle and transferred via the back of the brush head and the brush neck which are hard plastic. In this manner, when users experience incidental contact with the hard plastic, potentially uncomfortable vibrations, through the hard plastic, are reduced.

Moreover, as additional load is applied to the contact surface, the motion of the bristles remains steady and the bristles continue to rotate by the predetermined angle of rotation. Still further, users who tested the electric toothbrush reported an enhanced experience when brushing with the micro-vibration.

In one embodiment, an electric toothbrush includes a brush head including a plurality of bristles attached to the brush head at a non-perpendicular angle with respect to the brush head. The electric toothbrush also includes an electric toothbrush handle removably attached to the brush head. The electric toothbrush handle includes a motor configured to drive the plurality of bristles attached to the brush head to rotate about an axis of rotation normal to a mounting surface of the brush head clockwise and counterclockwise with respect to the brush head at a rotation frequency which is at or above a frequency threshold. The brush head moves toward and away from a contact surface in synchronization with the rotation of the plurality of bristles.

In another embodiment, an electric toothbrush includes a brush head including a plurality of bristles attached to the brush head. The electric toothbrush also includes an electric toothbrush handle removably attached to the brush head. The electric toothbrush handle includes a motor configured to drive a gearing structure coupled to the motor, the gearing structure configured to transform movement of the motor into rotation of the plurality of bristles attached to the brush head to rotate clockwise and counterclockwise with respect to the brush head at a predetermined rotation frequency and to drive the brush head to move toward and away from a contact surface via bristle driven pulsation.

In yet another embodiment, an electric toothbrush includes a brush head including a plurality of bristles attached to the brush head at a non-perpendicular angle with respect to the brush head. The electric toothbrush also includes an electric toothbrush handle removably attached to the brush head. The electric toothbrush handle includes a motor configured to drive the plurality of bristles attached to the brush head to rotate clockwise and counterclockwise with respect to the brush head at a rotation frequency which is at or above a frequency threshold and to cause the brush head to vibrate. An amount of the vibration of the brush head increases as a load applied to a contact surface increases above a threshold amount.

In another embodiment, an electric toothbrush includes a brush head including a plurality of bristles attached to the brush head at a non-perpendicular angle with respect to the brush head. The electric toothbrush also includes an electric toothbrush handle removably attached to the brush head. The electric toothbrush handle includes a motor configured to drive the plurality of bristles attached to the brush head to rotate clockwise and counterclockwise with respect to the brush head at a rotation frequency which is at or above a frequency threshold and to cause the brush head to vibrate. The brush head vibrates at one or more vibration frequencies corresponding to the rotation frequency.

In yet another embodiment, an electric toothbrush includes a brush head including a plurality of bristles attached to the brush head at a non-perpendicular angle with respect to the brush head. The electric toothbrush also includes a brush neck attached to the brush head and an electric toothbrush handle removably attached to the brush neck. The electric toothbrush handle includes a motor configured to drive the plurality of bristles attached to the brush head to rotate clockwise and counterclockwise with respect to the brush head at a rotation frequency which is at or above a frequency threshold and to cause the plurality of bristles, the brush head, and the brush neck to vibrate. An amount of the vibration at the plurality of bristles exceeds an amount of vibration at the brush head and an amount of vibration at the brush neck.

In another embodiment, an electric toothbrush includes a brush head including a plurality of bristles attached to the brush head at a non-perpendicular angle with respect to the brush head. The electric toothbrush also includes a brush neck attached to the brush head and an electric toothbrush handle removably attached to the brush neck. The electric toothbrush handle includes a motor configured to drive the plurality of bristles attached to the brush head to rotate clockwise and counterclockwise by a predetermined angle of rotation with respect to the brush head at a rotation frequency which is at or above a frequency threshold and to cause the brush head vibrate. An amount of rotation of the plurality of bristles remains substantially the same as a load applied to a contact surface increases.

In yet another embodiment, a method for providing bristle driven pulsation of an electric toothbrush includes causing, by a motor included in an electric toothbrush handle, a gearing structure to rotate a plurality of bristles included in a brush head clockwise and counterclockwise with respect to the brush head at a rotation frequency which is at or above a frequency threshold, where the plurality of bristles are attached to the brush head at a non-perpendicular angle with respect to the brush head. As the plurality of bristles rotate, the method includes causing, by the motor or the gearing structure, the brush head to move toward and away from a contact surface in synchronization with the rotation of the plurality of bristles.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

FIG. 4 illustrates a table depicting the micro-vibration of the electric toothbrush of FIG. 1 having various brush head types as the bristles rotate;

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Figure 1:
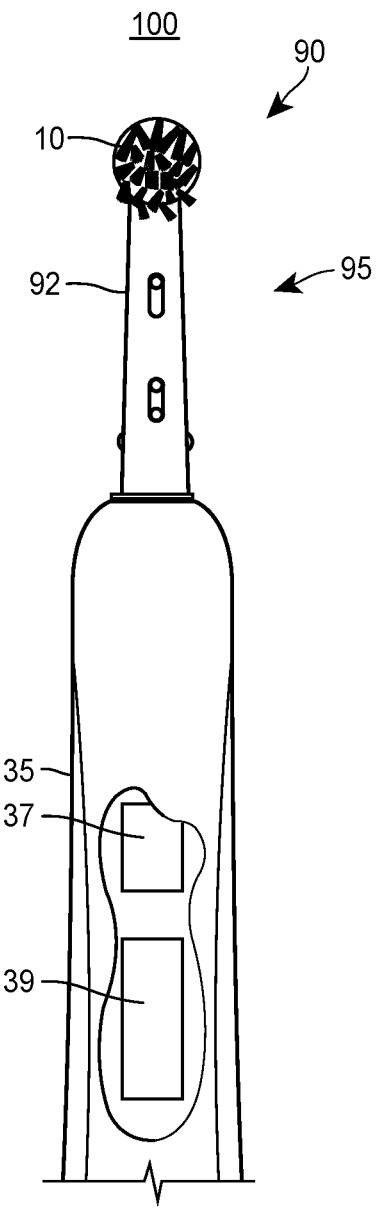
FIG. 1 illustrates an example electric toothbrush having angled bristles.

FIG. 1 illustrates an example electric toothbrush 100 having angled bristles. The electric toothbrush 100 may include an electric toothbrush handle 35 and a brush refill 92 removably attached to the electric toothbrush handle 35 and including a brush head 90 attached to a brush neck 95. The electric toothbrush 100 may include a motor 37 and an energy source 39 that is in electrical communication with the motor 37. The motor 37 is operatively coupled to a movable bristle holder disposed on the brush head 90 to move the bristle holder. More specifically, the bristle holder may be a disk included in the brush head 90, where each of the tufts are attached to the disk. When the disk rotates, each of the tufts rotate. In some embodiments, the motor 37 is a linear motor and is operatively coupled to the movable bristle holder via a gearing structure, described in more detail below with reference to FIG. 3. The bristle holder can rotate, oscillate, translate, vibrate, or undergo a movement that is a combination thereof. The motor 37 may cause the bristle holder to rotate/oscillate back and forth by a predetermined angle of rotation (e.g., 28°, 33°, 45°, etc.) and at a particular rotation frequency which exceeds a threshold frequency (e.g., 100 Hz, 115 Hz, 130 Hz, 145 Hz, etc.). For example, the motor 37 may cause the bristle holder to rotate by the predetermined angle of rotation in a clockwise manner, during a first time interval, and then by the predetermined angle of rotation in a counter clockwise manner, during a second time interval, at over 100 cycles per second. In some implementations, the bristle holder may be rotated at a particular rotation frequency which is in a threshold frequency range (e.g., between 100 Hz and 200 Hz, between 100 Hz and 150 Hz, etc.).

A bristle tuft 10 is attached to the bristle holder and includes several bristles. As shown in FIG. 1, at least some of the bristle tufts 10 and bristles are angled with respect to a mounting surface of the brush head 90, such that the bristle tufts 10 and bristles are disposed at non-perpendicular angles with respect to the mounting surface of the brush head 90. This is described in more detail below with reference to FIG. 2. The brush head 90 can be provided as a removable head so that it can be removed and replaced when the bristles (or other components) of the bristle holder have deteriorated. Examples of electric toothbrushes that may be used with the present invention, including examples of drive systems for operatively coupling the motor to the bristle holder (or otherwise moving the bristle holder or the head), types of cleaning elements for use on a bristle holder, structures suitable for use with removable heads, bristle holder movements, other structural components and features, and operational or functional features or characteristics of electric toothbrushes are disclosed in USPNs 2002/0129454; 2005/0000044; 2003/0101526; U.S. Pat. Nos. 5,577,285; 5,311,633; 5,289,604; 5,974,615; 5,930,858; 5,943,723; 2003/0154567; 2003/0163881; 2005/0235439; U.S. Pat. No. 6,648,641; 2005/0050658; 2005/0050659; 2005/0053895; 2005/0066459; 2004/0154112; U.S. Pat. No. 6,058,541; and 2005/008050.

While the bristle tufts 10 and bristles are shown in FIG. 1 as being disposed at non-perpendicular angles with respect to the mounting surface of the brush head 90 this is merely one example for ease of illustration only. In other implementations, the bristle tufts 10 and bristles are disposed at perpendicular angles with respect to the mounting surface of the brush head 90.

In some embodiments, the electric toothbrush 100 may include one or several sensors which may be included in the head 90, neck 95, or handle 35 of the electric toothbrush. The sensors may include light or imaging sensors such as cameras, electromagnetic field sensors such as Hall sensors, capacitance sensors, resistance sensors, inductive sensors, humidity sensors, movement or acceleration or inclination sensors such as multi-axis accelerometers, pressure sensors, gas sensors, vibration sensors, temperature sensors, etc. The electric toothbrush 100 may also include a light emitting diode (LED) disposed around the exterior of the handle 35 or the brush neck 95 that is configured to change color based on forces or pressures detected at the pressure sensor. For example, when the electric toothbrush 100 is activated and the user begins brushing, the LED may emit a white light. When the user applies a force to the surface of her teeth that exceeds a first threshold force (e.g., 0.8 N), the LED changes color and may emit green light indicating that the user is brushing with the proper amount of force. Then when the user begins to apply too much force by applying a force above a second threshold force (e.g., 2.5 N), the LED once again changes color and may emit red light or another colored light indicating that the user is applying force outside of an optimal force range (e.g., 0.8 N-2.5 N). A controller included in the electric toothbrush 100 may receive pressure or force data from the pressure sensor. The controller may compare the pressure or force data to the first threshold force and the second threshold force, and may provide a control signal to the LED to emit a particular color based on the comparison.

In some embodiments, the refill 92 is disposable and several refills 92 may be attached to and removed from the electric toothbrush handle 35. For example, a family of four may share the same electric toothbrush handle 35 while each attaching their own refill 92 to the electric toothbrush handle 35 during use. Additionally, the refills 92 may have limited lifespans, and a user may change out an old refill for a new refill after a certain number of uses.

Figure 2:
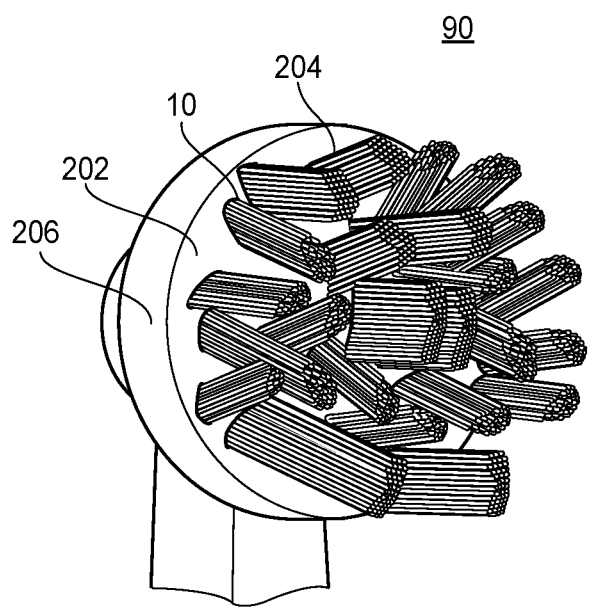
FIG. 2 illustrates an example brush head that can operate in the electric toothbrush of FIG. 1.

FIG. 2 illustrates an enlarged view of the brush head 90 of FIG. 1. As described above the brush head 90 includes a mounting surface 202 with a movable bristle holder 206 disposed on the mounting surface 202. Bristle tufts 10, 204 each including several bristles are attached to the bristle holder 206. As shown in FIG. 2, the tufts 10, 204 may be disposed at various non-perpendicular angles with respect to the mounting surface 202. The tufts 10, 204 may be inclined or declined with respect to a line perpendicular to the mounting surface 202, may be angled to the right or the left with respect to the line perpendicular to the mounting surface 202, or may be angled in any suitable combination of an incline or a decline and to the right or to the left of the line perpendicular to the mounting surface 202.

To rotate the bristle holder 206 by the predetermined angle of rotation at the predetermined rotation frequency, the motor 37 is coupled to a gearing structure which is coupled to the bristle holder 206. The motor 37 may be a linear motor that drives the gearing structure. As the linear motor 37 moves up and down, the gearing structure transforms the movement of the linear motor 37 into rotation of the bristles. More specifically, the linear motor 37 may provide a linear oscillatory motion via a drive shaft coupled to the linear motor 37, which linear oscillation is transferred to the brush head 90 and may be converted by a respective gear unit into an oscillatory rotation of the bristle holder 206 around a rotation axis that may be essentially perpendicular to a longitudinal axis along which the drive shaft vibrates or about an axis of rotation normal to a mounting surface of the brush head 90. The motor 37, via the linear oscillatory motion, causes the gearing structure to rotate the bristles clockwise and counterclockwise by a predetermined angle of rotation (e.g., 28°) at a particular rotation frequency (e.g., 145 Hz) which exceeds a threshold frequency (e.g., 100 Hz). As the bristles rotate, the motor 37, also via the linear oscillatory motion, causes the brush head 90 to vibrate, moving toward and away from a contact surface such as the user's teeth in synchronization with the rotation of the bristles.

Figure 3A:
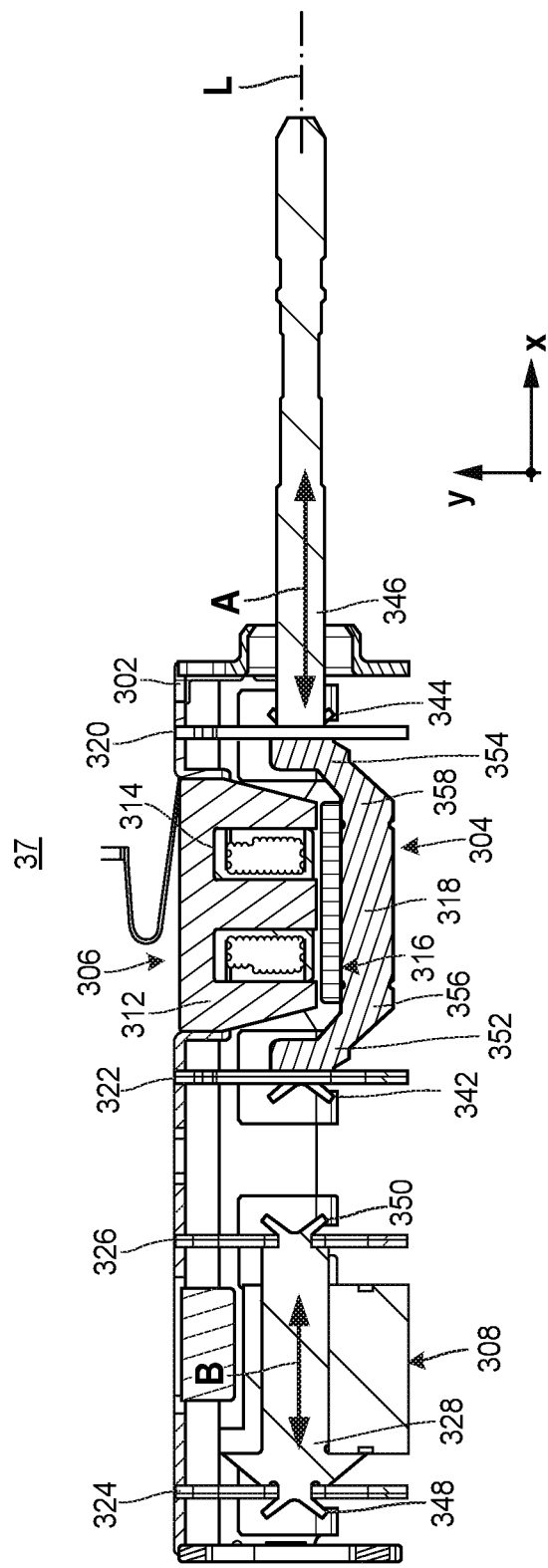
FIG. 3A illustrates an example cross-sectional view of the interior of the electric toothbrush handle.

The interior of the electric toothbrush handle 35 including the motor 37 and at least a portion of the gearing structure is illustrated in FIG. 3A. In some embodiments, the drive shaft may be included in the gearing structure. As described above, the electric toothbrush 100 includes an electric toothbrush handle 35 and a detachable refill 92. A motor housing 302 is disposed in the handle 35.

The linear motor 37 may have a motor housing 302, an armature 304 mounted for linear oscillation along a longitudinal direction (which is parallel to a longitudinal axis L) as indicated by double arrow A, a stator 306, a secondary mass unit 308 mounted for linear oscillation along the longitudinal direction as indicated by double arrow B. A Cartesian coordinate system is indicated, where the x axis coincides with the longitudinal axis L and the y axis is perpendicular to the x axis in the side to side direction. The z axis is the direction toward and away from the contact surface.

The stator 306 comprises a coil core 312 that may be fixedly connected with the motor housing 302 and a stator coil 314 wound around the coil core 312. While in FIG. 3A an E-shaped (i.e. three-toothed) back iron is shown, this shall not exclude that other back-iron designs may be utilized, for example, a U-shaped (i.e. two-toothed) back iron. The teeth of the coil core 312 have end surfaces that face a permanent magnet arrangement 316 mounted at a center section 318 of the armature 304. The linear motor 37 may comprise at least two electrical contacts for providing electric current to the stator coil 314 during operation. The coil core 312 may be made from a stack of isolated sheets such as ferromagnetic metal sheets ("soft iron", for example, Fe—Si based metal).

The armature 304 may also (at least partly) be made from a stack of isolated sheets such as ferromagnetic metal sheets (for example, Fe—Ni based metal). The armature 304 may be mounted at the housing 302 by means of at least one armature mounting spring assembly 320, 322 and the secondary mass unit 308 may be mounted at the motor housing 302 by means of at least one secondary mass mounting spring assembly 324, 326. In the shown example embodiment, the armature 304 is mounted at the housing 302 by means of two armature mounting spring assemblies 320 and 322 and the secondary mass 328 is mounted at the housing by means of two secondary mass mounting spring assemblies 324 and 326. In one embodiment, the armature mounting spring assemblies 320 and 322 or the secondary mass mounting spring assemblies 324 and 326 may be realized as leaf springs that may each extend in a rest state in a plane being perpendicular to the longitudinal axis L, which leaf springs may have a spiral-like shape with a first fastening section being arranged at the outside of the spring and a second fastening section being arranged more in a center area of the spring.

Each of the mounting spring assemblies 320, 322, 324, 326 may be at one end (i.e. with a first fastening section) fixedly connected at or with relation to the motor housing 302 and at another end (i.e. at a second fastening section) fixedly connected with the armature 304 or the secondary mass unit 308, respectively. Each of the mentioned spring assemblies 320, 322, 324, or 326 may be made from a single leaf spring or from a stack of (in particular identically shaped) leaf springs stacked in the x direction. Each of the leaf springs may have a certain thickness in the x direction to achieve a target spring constant. The thickness and the number of the leaf springs may be set to tune the characteristics of the components of the linear motor 37 such as the resonance and anti-resonance (or: cancellation) frequencies (the anti-resonance or cancellation frequency is the frequency at which the armature and the secondary mass do not only move with essentially opposed phase but also with essentially identical amplitude such that the vibrations transferred to the motor housing are minimal). While a high spring constant could be achieved by a thick leaf spring instead of a stack of two thinner leaf springs, it has been found that a thicker leaf spring has a different deflection curve than a stack two thin leaf springs and that the latter has a better fatigue resistance and thus may improve the long life behavior of the overall motor design. As the two oscillating systems, namely the first system comprising armature 304 together with the respective armature mounting spring assemblies 320 and 322 and the second system comprising the secondary mass unit 308 and the respective secondary mass mounting spring assemblies 324 and 326, are strongly coupled, the resonance frequencies of the two systems are strongly dependent. In one embodiment, the armature 304 may have fastening protrusions 342 and 344 that extend in the x direction and that are centrically disposed with respect to the longitudinal axis L. As shown in FIG. 3A for an example embodiment of a linear motor in accordance with the present disclosure, the bottom fastening protrusion 342 may be fixedly connected with the bottom armature mounting spring assembly 322. Further, the top fastening protrusion 344 may be fixedly connected with the top armature mounting spring assembly 320. Additionally, the top fastening protrusion 344 may establish a connection with a drive shaft 346 such that the linear oscillation of the armature 304 indicated by double arrow A is transferred during operation to the drive shaft 346 and from the drive shaft 346 to the bristle holder 206 to be driven into motion. The drive shaft 346 may be centrically disposed with respect to the longitudinal axis L.

Further, the secondary mass 328 may have fastening protrusions 348 and 350 that extend in the x direction (i.e. in longitudinal extension direction) and that are centrically disposed along the longitudinal extension axis L. The top fastening protrusion 350 may be fixedly connected with the top secondary mass mounting spring assembly 326. Further, the bottom fastening protrusion 348 may be fixedly connected with the bottom secondary mass mounting spring assembly 324.

The whole assembly of armature 304 (together with the respective armature mounting spring assemblies 320 and 322) and secondary mass unit 308 essentially forms a two-mass oscillator (neglecting here that the armature 304 may be connected via the drive shaft 346 with a further at least partially spring-like attachment section that will be driven during operation and also assuming that the housing vibrations may cancel each other completely so that the housing mass can also be neglected). As will be explained in more detail below, the secondary mass unit 308 is utilized to be excited into a counter-oscillation with respect to the armature oscillation during operation. Thus, the vibrations transferred to the motor housing 302 (and thus to the handle 35 of the electric toothbrush 100 in which the linear motor 37 is mounted) will on the one hand be reduced over a design without a secondary mass unit 308 and the vibrations transferred to the housing will on the other hand at least partially cancel each other out due to the counter-phase oscillation of the secondary mass unit 308 with respect to the oscillation of the armature 304. In order to achieve this, changes in the oscillation of the armature 304 (for example, due to load applied at the linear motor 37) are quickly transferred to the secondary mass unit 308 such that the counter-oscillations can reduce the vibrations felt by a user holding the handle section of the electric device The armature 304 may comprise several sections, namely two end sections 352 and 354, one center section 318 and two intermediate sections 356 and 358 that each connect one end of the center section 318 with a respective end section 352 or 354, i.e. the bottom intermediate section 356 connects the bottom end of the center section 318 with the bottom end section 352 and the top intermediate section 358 connects the top end of the center section 318 with the top end section 354. While the bottom and top end sections 352 and 354 may be centrically disposed around the longitudinal axis L, which has a certain distance to the motor housing 302, the center section 318 is disposed with only a small distance to the motor housing 302, i.e. the center section 318 extends along a longitudinal axis that is parallel to the longitudinal axis L and that lies closer to the motor housing 302. Hence, the center section 318 is retracted towards one side of the motor housing 302 so that more construction volume is made available between the center section 318 and the opposite side of the motor housing 302. In contrast to other linear motor designs known from electric toothbrushes where the stator is arranged around the armature, this particular design of the armature 304 as discussed allows arranging the stator 306 opposite to the center section 318 of the armature 304 at the opposite side of the motor housing. A permanent magnet assembly 316 is disposed on a side of the center section 318 of the armature 304 that faces the end surfaces of the teeth of the coil core 312. The permanent magnets may be made from (sintered) FeNdB (neodymium-iron-boron) material.

In particular, an air gap between the end surfaces of the coil core 312 and the permanent magnet arrangement 316 may extend close to, approximately centrically with respect to the longitudinal axis L, which design may lead to lower tilting forces during operation, which supports using the mounting spring assemblies also as bearings for the armature. This leads on one hand to a more simple motor design, hence to a relatively low cost realization of the linear motor, and on the other hand to a design option that allows higher forces to be provided by the linear motor at a given construction volume.

Figure 3B:
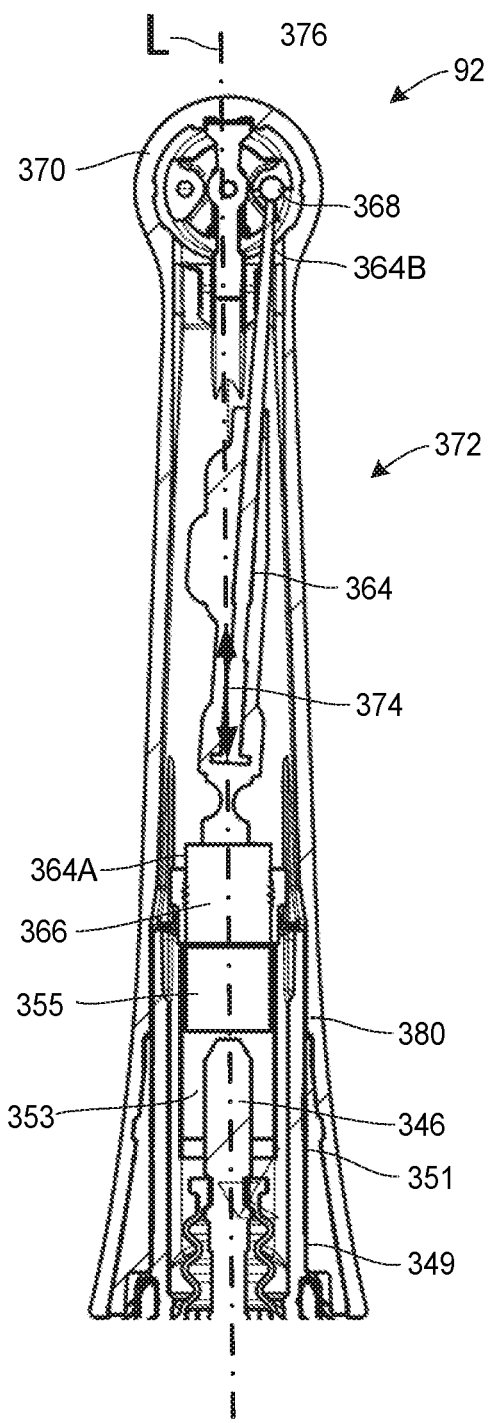
FIG. 3B illustrates an example cross-sectional view of the interior of an electric toothbrush refill.

FIG. 3B illustrates example gearing structure included in the refill 92 to drive the motion of the bristle holder 206. The drive shaft 346 illustrated in FIG. 3A and included in the electric toothbrush handle 35 is coupled to the refill 92 and oscillates linearly. The drive shaft 346 extends in a hollow of a generally tubular front housing 349 in the electric toothbrush handle 35 that ends in an connection section 351, which may comprise a connector structure suitable to establish an in particular mechanical connection with a respective connector structure at an attachment section. The drive shaft 346 has at its free end (opposite to its end where it is coupled to the armature 304) a holder section 353 that may accommodate a magnetic coupling element 355 for establishing a magnetic connection with a respective magnetic coupling element of an attachment element 366 such that the drive shaft 346 can transfer the linear oscillation provided by the armature 304 to the bristle holder 370 mounted at the refill 92 for driven movement. The linear motion may be converted by a respective gear unit in the refill 92 into an oscillatory rotation of the bristle holder 206 around a rotation axis that may be essentially perpendicular to a longitudinal axis along which the drive shaft vibrates or about an axis of rotation normal to a mounting surface of the brush head 90.

Referring to FIG. 3B, the refill 92 includes a gearing structure coupled to the drive shaft 346 which is coupled to the linear motor 37, where the gearing structure includes a drive member 364 having a proximal end 364A and a distal end 364B. The proximal end 364A may comprise a first attachment element 366, and the distal end 364B may comprise a connection 368. The connection 368 may be coupled to the bristle holder, e.g. 370. The bristle holder 370 may be rotationally coupled to the attachment housing 372 such that when driven, the bristle holder 370 may move in an oscillating rotating manner. As shown in FIG. 3B, when connected the outer surface of the electric toothbrush handle 35 and an inner surface of the refill 92 are in close contact generating a contact zone 380. To avoid clearance a press fit may be used, wherein the interference fit may be between 0.04 mm and 0.16 mm in diameter between both parts. This tight fit or lack of clearance between the connection section 351 of the electric toothbrush handle 35 and the attachment element of the refill 92 creates lateral stiffness preventing side-to-side motion of the refill 92. In this manner, bristle bending and buckling forces generated as the bristles move in contact with a contact surface such as a user's tooth surface induce motion in the bristle holder 370 toward and away from the contact surface rather than side-to-side.

The first attachment element 366 may comprise a permanent magnet or a magnetizable element such as a block of magnetizable iron or steel. Typically, austenitic steel is not magnetizable, while martensitic or ferritic steel typically is magnetizable. The first attachment element 366 may be disposed within a recess in the proximal end 364A of the drive member 364.

As shown, the drive member 364 may reciprocate generally parallel to the longitudinal axis L2 as shown by arrow 374. Because the connection 368 is eccentric to a pivot 376, the reciprocating motion of the drive member 364 causes the bristle holder 370 to rotate about a rotational axis.

The drive member 364 may be relatively slim to allow it to fit compactly within the refill 92. Additionally, the drive member 364 may be mechanically stable and be capable of transmitting forces of about 10 N. Also, the drive member 364 may have a natural frequency of at least 200 Hz, greater than about 225 Hz, greater than about 250 Hz, greater than about 275 Hz, or any number or any range including or within the values provided.

The drive member 364 may comprise any suitable material. Some examples include polyoxymethylene (POM), polyamide (PA), or polybutylene terephthalate (PBT). In some embodiments, additional reinforcement may be added to the drive member 364. For example, reinforcement fibers, e.g. Kevlar™ fibers may be added to the material of the drive member 364. Any other suitable reinforcement fibers may be added. Additionally, the drive member 364 may comprise a shape which is constructed to reduce the likelihood of buckling. For example, the drive member 364 may comprise a cross section which is in the shape of a cruciform, a Y, or any other suitable shape.

As stated previously, in some embodiments, the electric toothbrush 100 may have an operating frequency of greater than about 120 Hz. With such frequencies, it is important that the refill 92 has a resonance frequency which is greater than that of the operating frequency, in some embodiments. If the resonance frequency of the refill 92 is too close to the desired frequency, then during operation, resonance motions may be induced in the refill 92. For example, the refill 92 or the drive member 364 may experience side to side motion. This side to side motion may cause some discomfort to the user and/or additional noise generation during operation. For those embodiments where resonance motions are not desirable, the resonance frequency of the refill 92 may be greater than about 125 percent of the desired frequency.

The linearly oscillating motion A causes the gearing structure coupled to the motor 37 to rotate the bristle holder 206. In some implementations, the rotation frequency of the bristle holder 206 is in proportion with the frequency of the linearly oscillating motion A. Furthermore, the rotation amplitude or predetermined angle of rotation is in proportion with the amplitude of the oscillating motion A.

In addition to causing the gearing structure included in a refill 92 having a press fit with the electric toothbrush handle 35 of less than a threshold distance to rotate the bristle holder 206, when in contact with a contact surface such as the surface of a user's teeth, the linearly oscillating motion M of the motor, the gearing structure including the tight fit or lateral stiffness of the refill 92 to the electric toothbrush handle 35, and/or the bristle bending and buckling forces generated as the bristles move cause the brush head 90 to move slightly toward and away from the contact surface (also referred to as the z direction) in a periodic manner (e.g., the amount of movement in the direction of the contact surface may be less than 300 μm, may be between 100 μm and 300 μm, etc.), which may be referred to as vibration or micro-vibration. In some embodiments, the micro-vibration may be caused by the properties of the bristles, such as the bristle density, the angle at which the bristles are disposed on the bristle holder 206, the stiffness of the bristle fibers resulting in bending and buckling forces, etc. FIG. 4 illustrates example movement of the brush head 90 as the bristles rotate for three different brush heads 90. Each brush head 90 may include a different brush head design where the tufts 10 are angled differently and the brush heads 90 include different bristle densities. For example, the tufts 10 in the first brush head (Brush Head A) may be angled and may have a bristle density of about 3740 bristles. The tufts 10 in the second brush head (Brush Head B) may be straight and may have a higher bristle density of about 4000 bristles. The tufts 10 in the third brush head (Brush Head C) may be angled and may have a lower bristle density of about 2460 bristles.

As shown in the table 400, when the bristles rotate to the left, Brush Head B and Brush Head C move toward and away from the contact surface with a smaller amplitude (e.g., 50 μm) than Brush Head A. When the bristles rotate to the left, Brush Head A moves toward and away from the contact surface with a larger amplitude (e.g., 150 μm) than Brush Heads B and C. When the bristles rotate to the right, Brush Head B once again moves toward and away from the contact surface with the smaller amplitude (e.g., 50 μm). Accordingly, Brush Head B vibrates twice during one rotation cycle of the bristles. This is further illustrated in FIG. 8B described in more detail below. Brush Head C only moves toward and away from the contact surface when the bristles rotate to the left. This is further illustrated in FIG. 8C described in more detail below. Additionally, when the bristles rotate to the right, Brush Head A does not move during a first portion of the rotation. Brush Head A then moves toward and away from the contact surface with the smaller amplitude (e.g., 50 μm) during a second portion of the rotation to the right. This is further illustrated in FIG. 8A described in more detail below.

Figure 5A:
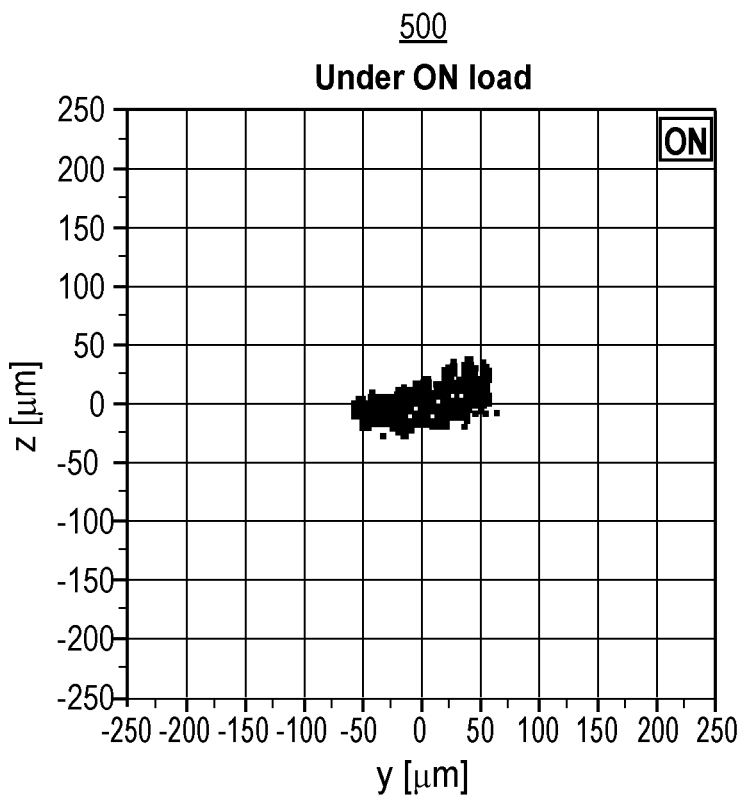
FIG. 5A illustrates a graph depicting example motion of the brush head when zero force is applied to a contact surface.
Figure 5B:
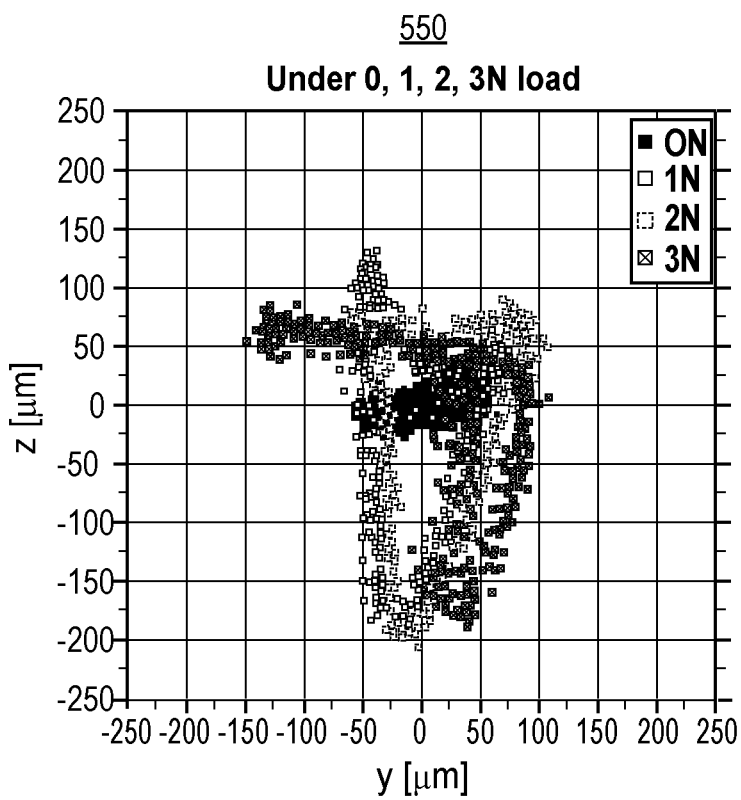
FIG. 5B illustrates another graph depicting example motion of the brush head when various amounts of force are applied to the contact surface.

FIGS. 5A and 5B illustrate the motion of the brush head 90 as various amounts of force are applied from the brush head 90 onto the contact surface. The motion occurs while the motor 37 is running and the bristles are rotating. The motion is illustrated in the z direction which is the motion of the brush head 90 toward and away from the contact surface, and the y direction which is the motion side-to-side of the brush head 90. The x direction is the motion up and down of the brush head 90. In any event, the graph 500 of FIG. 5A illustrates the motion of the brush head 90 when zero force is applied from the brush head 90 onto the contact surface (e.g., the electric toothbrush 100 has not yet made contact with the user's teeth). In this scenario, the brush head 90 moves very little and appears to move more in the y direction than in the z direction, but still has very little movement in the y direction (e.g., less than 100 μm). The graph 550 of FIG. 5B illustrates a comparative analysis of the motion of the brush head 90 when zero force is applied from the brush head 90 onto the contact surface, when 1 N of force is applied from the brush head 90 onto the contact surface, when 2 N of force are applied from the brush head 90 onto the contact surface, and when 3 N of force are applied from the brush head 90 onto the contact surface. While there is almost no movement in the z direction when zero force is applied from the brush head 90 onto the contact surface, the brush head 90 exhibits significantly more movement in the z-direction when 1 N, 2 N, and 3 N of force are applied. In each instance, the brush head 90 moves about 200-300 μm in the z direction. Additionally, the movement in the y direction when 1 N, 2 N, and 3 N of force are applied is about the same as when zero force is applied.

Figure 6:
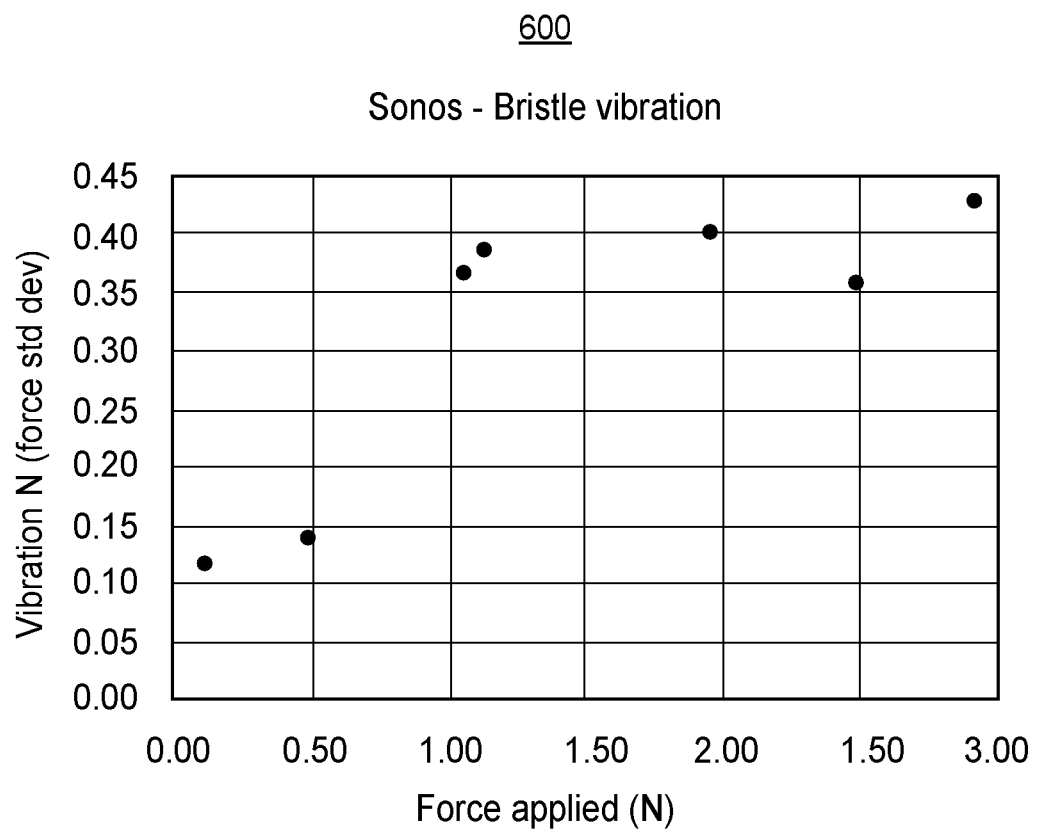
FIG. 6 illustrates yet another graph depicting the amount of vibration of the brush head when various amounts of force are applied to the contact surface.

This is illustrated more clearly in FIG. 6 which depicts a graph 600 showing the amount of vibration transmitted through the bristles of the brush head 90 when various amounts of force are applied to the contact surface. The graph 600 depicts the amount of vibration as a function of the force applied to the contact surface, where the amount of vibration is measured as the standard deviation of the force measured for each applied load. The standard deviation of the force applied indicates the vibration force or bristle contact force amplitude in the z direction of the brush head 90, because as the bristle bending/buckling force increases, the brush head 90 moves up and away from the contact surface, and as the bending/buckling force decreases, the brush head 90 moves back down towards the contact surface. In any event, as shown in the graph 600 when the force applied to the contact surface is less than 1 N, the amount of vibration is between 0.1 N and 0.15 N. Once the force applied to the contact surface increases above a threshold amount (e.g., at or above 0.8 N), the amount of vibration increases significantly to between 0.35 N and 0.45 N, tripling the amount of vibration when compared to the amount of vibration when the load is below 1 N.

Furthermore, the vibration of the brush head 90 or periodic movement toward and away from the contact surface may be synchronized with the rotation of the bristles, because the brush head 90 vibrates at vibration frequencies that correspond to the rotation frequency. More specifically, the vibration frequency components of the brush head 90 may include a base frequency as the rotation frequency of the bristles and/or multiples of the rotation frequency, such that the vibration frequency is harmonized with the rotation frequency. As a result, the amount of noise produced by the electric toothbrush 100 during the brushing period decreases compared to alternative systems which do not exhibit these harmonic effects. This also provides a smoother sound and a smoother brushing experience for the user.

Figure 7A:
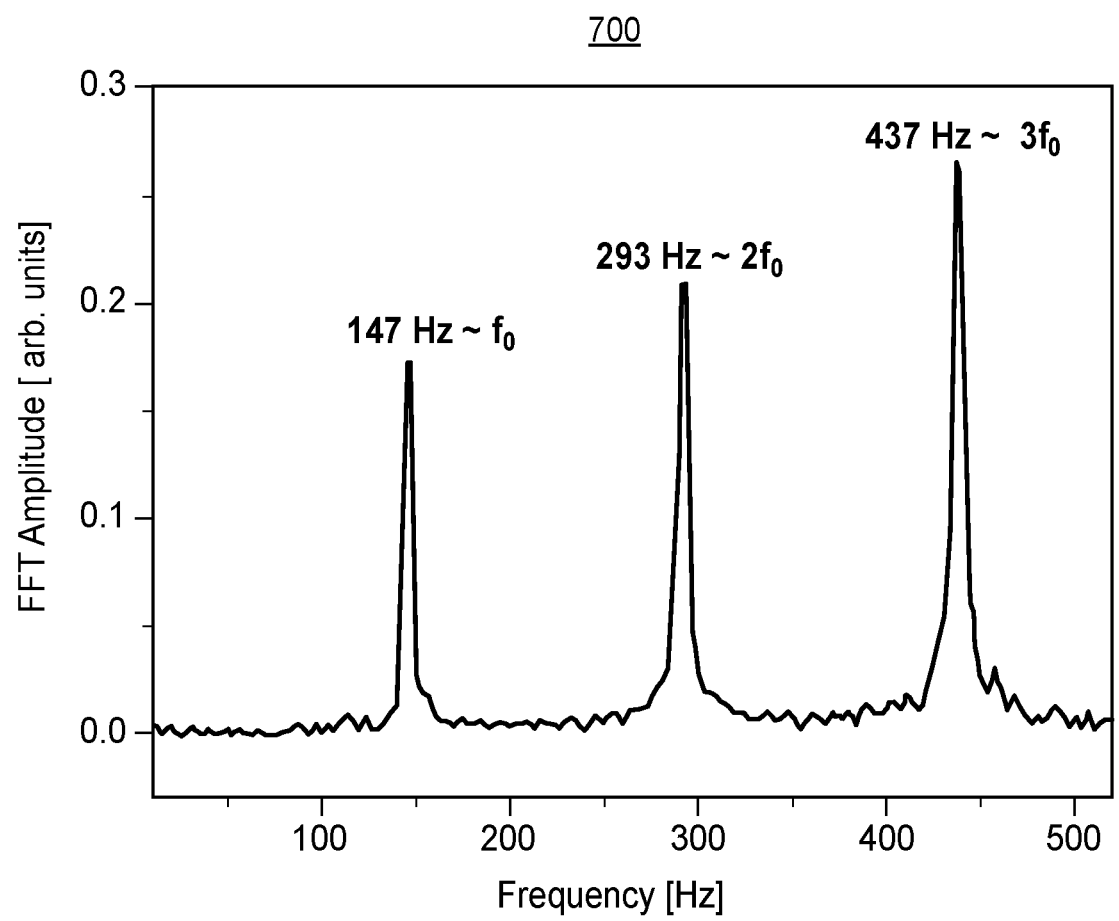
FIG. 7A illustrates a graph depicting a Fourier Transform analysis of the frequency components of the vibration of the brush head.

FIG. 7A illustrates a graph 700 depicting the frequency components of the vibration of the brush head 90 during the brushing period as an amount of force is applied to the contact surface that exceeds a threshold amount of force (e.g., 2 N). The frequency components are determined from a Fourier Transform analysis of the vibration transmitted through the bristles of the brush head 90, such as a Fast Fourier Transform (FFT). The rotation frequency for the bristles is 145 Hz. As shown in the graph 700, the peak frequencies are at 147 Hz, 293 Hz, and 437 Hz, which are substantially the same as the rotation frequency, twice the rotation frequency, and three times the rotation frequency, respectively. Accordingly, the vibration of the brush head 90 is synchronized with the rotation of the bristles and the rotation frequency and the vibration frequency are in harmony with each other.

Figure 7B:
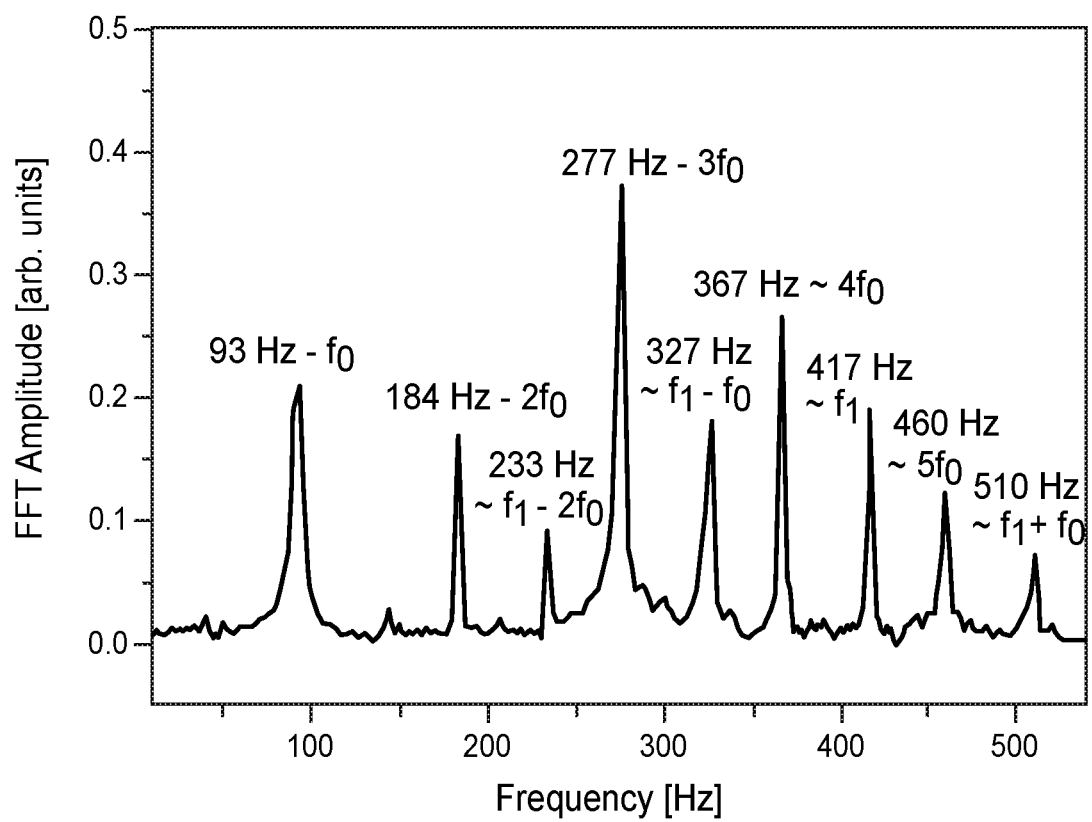
FIG. 7B illustrates a graph depicting a Fourier Transform analysis of the frequency components of the vibration of a brush head in an alternative electric toothbrush system.

By contrast, alternative electric toothbrushes which include a handle driven pulsation do not exhibit similar harmonic effects as shown in the graph 750 of FIG. 7B. Instead, the frequency components of the vibration of alternative electric toothbrushes appear to include multiple base frequencies and mixtures of those base frequencies resulting in a louder and rougher sounding toothbrush. More specifically, as shown in the graph 750, the peak frequencies include a first base frequency of 93 Hz which is substantially the same as the rotation frequency and a second base frequency of 417 Hz which is substantially the same as a pulsation frequency for the alternative electric toothbrush. The peak frequencies also include 184 Hz which is about twice the first base frequency, 233 Hz which is the difference between the second base frequency and twice the first base frequency, 277 Hz which is about three times the first base frequency, 327 Hz which is the about difference between the second base frequency and the first base frequency, 367 Hz which is about four times the first base frequency, 460 Hz which is about five times the first base frequency, and 510 Hz which is the sum of the first base frequency and the second base frequency.

Figure 8A:
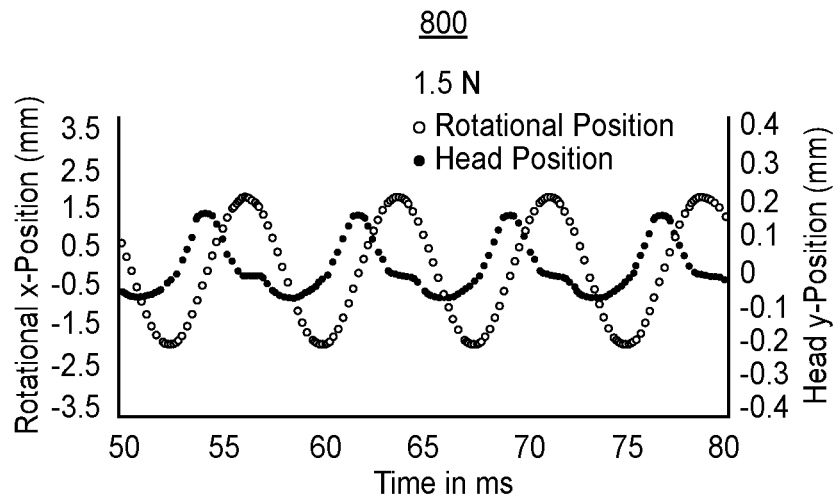
FIG. 8A illustrates a graph depicting example motion of the brush head and rotation of the bristles for a first refill having a first refill design.
Figure 8B:
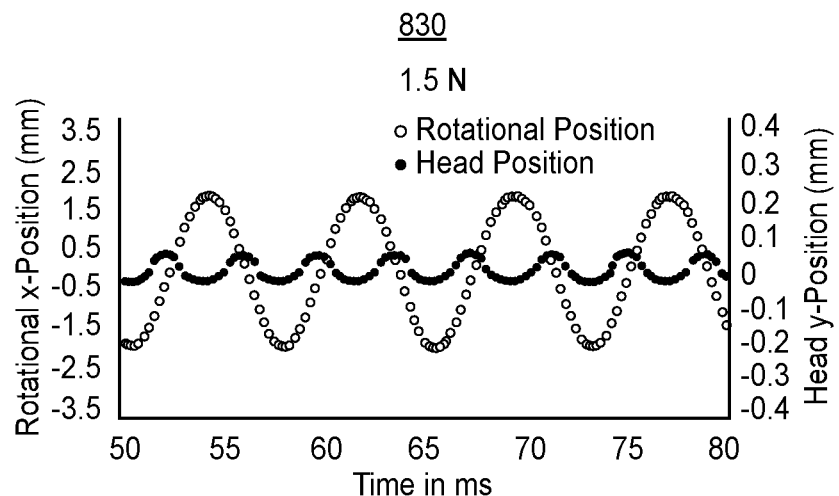
FIG. 8B illustrates another graph depicting example motion of the brush head and rotation of the bristles for a second refill having a second refill design.
Figure 8C:
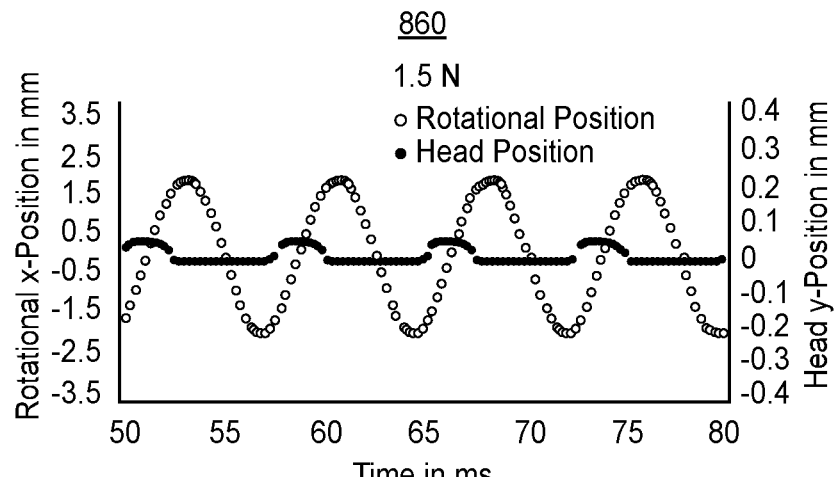
FIG. 8C illustrates yet another graph depicting example motion of the brush head and rotation of the bristles for a third refill having a third refill design.

FIGS. 8A-8C illustrate additional examples of the synchronization between the vibration of the brush head 90 and the rotation of the bristles for three different refills 92. Each refill 92 may include a different refill design where the tufts 10 are angled differently, and may include different tuft sizes, bristle densities, and overall bristle counts, which impact the amplitude and frequency of the micro-vibration. For example, the tufts 10 in the first refill may be angled at 16°, the tufts 10 in the second refill may be perpendicular to the brush head, and the tufts 10 in the third refill may be angled at 16° and have significantly lower bristle density than the first refill.

Each of the graphs 800, 830, 860 include a comparison of the bristles' rotational movement and brush head movement as a function of time. In each graph 800, 830, 860, both the bristles and the brush head 90 exhibit a sinusoidal movement pattern. Additionally, the vibration and rotation frequencies appear to either be the same or multiples of each other. For example, in the graph 800, the periods of each cycle for the vibration and the rotation both appear to be about 7 ms indicating vibration and rotation frequencies of about 145 Hz. In the graph 830, the period for the vibration appears to be about half as long as the period for the rotation, indicating a rotation frequency of about 145 Hz and a vibration frequency of about 290 Hz. Similar to the graph 800, in the graph 860, the periods for the vibration and the rotation both appear to be about every 7 ms indicating vibration and rotation frequencies of about 145 Hz.

Additionally, in each graph 800, 830, 860 the periods and the amplitudes for the vibration and the rotation remain consistent over time. For example, in the graph 800, each period for the vibration is about 7 ms and each period for the rotation is about 7 ms. Moreover, in the graph 800, each amplitude for the vibration is about 0.15 mm and each amplitude for the rotation is about 1.5 mm. The amplitudes and the periods do not vary over time. This differs from alternative electric toothbrushes where the periods and the amplitudes for the vibration are inconsistent and may vary widely over time or with different brushing loads applied.

Figure 9A:
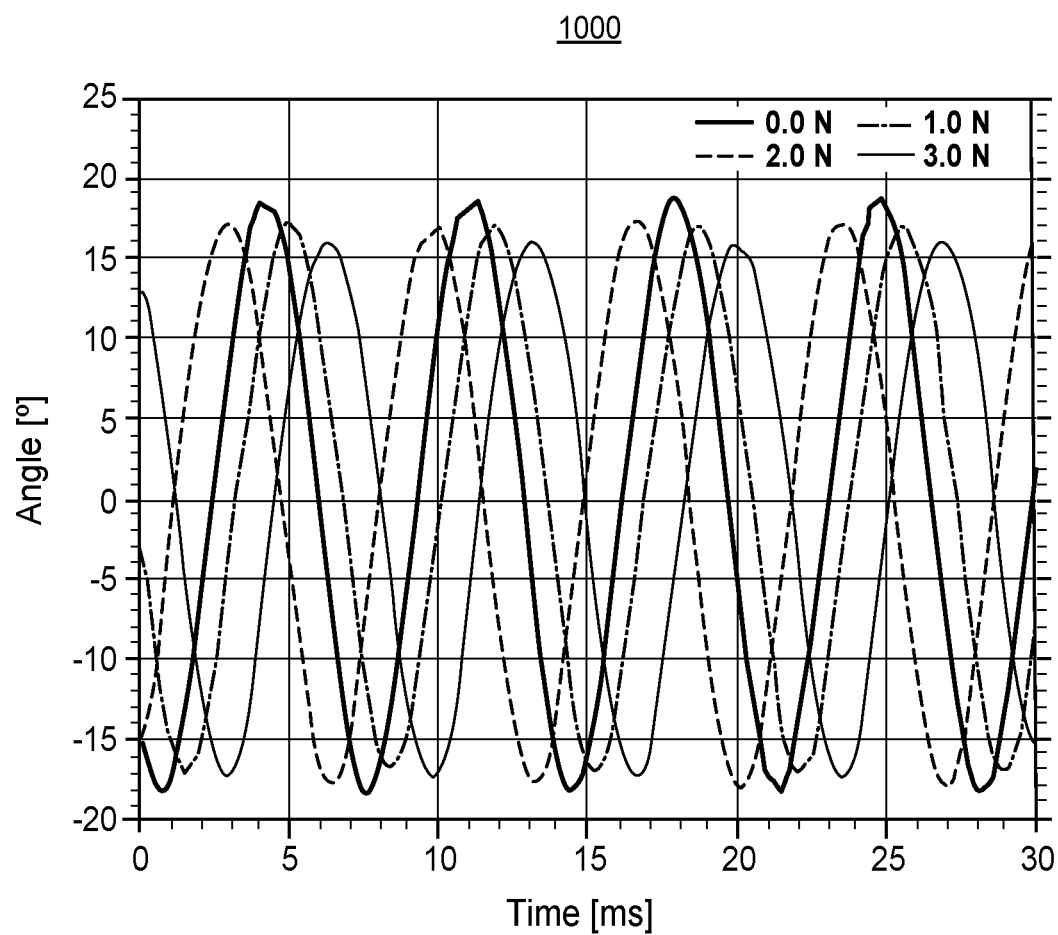
FIG. 9A illustrates a graph depicting example angles of rotation of the bristles over time as various amounts of force are applied to the contact surface.

Furthermore, during the brushing period the motor 37 causes the bristle holder 206 to maintain a consistent angle of rotation matching the predetermined angle of rotation regardless of the load or the amount of force applied to the contact surface. This is illustrated in FIG. 9A which depicts a graph 1000 showing example angles of rotation for the bristles over time as various amounts of force are applied to the contact surface. In the graph 1000, the angle of rotation when 0 N are applied to the contact surface is about 33°. Likewise, when 1 N, 2 N, or 3 N are applied to the contact surface the angle of rotation is also about 33° or between for example, 31° and 35°. Therefore, the amount of rotation for the bristles remains substantially the same as the load applied to the contact surface increases. The angle of rotation for the bristle holder 206 does not decrease under load as in alternative electric toothbrush systems, where larger loads lead to smaller angles of rotation due to the bristles collapsing and/or the applied load reducing the effective travel of the motor/gear system.

Figure 9B:
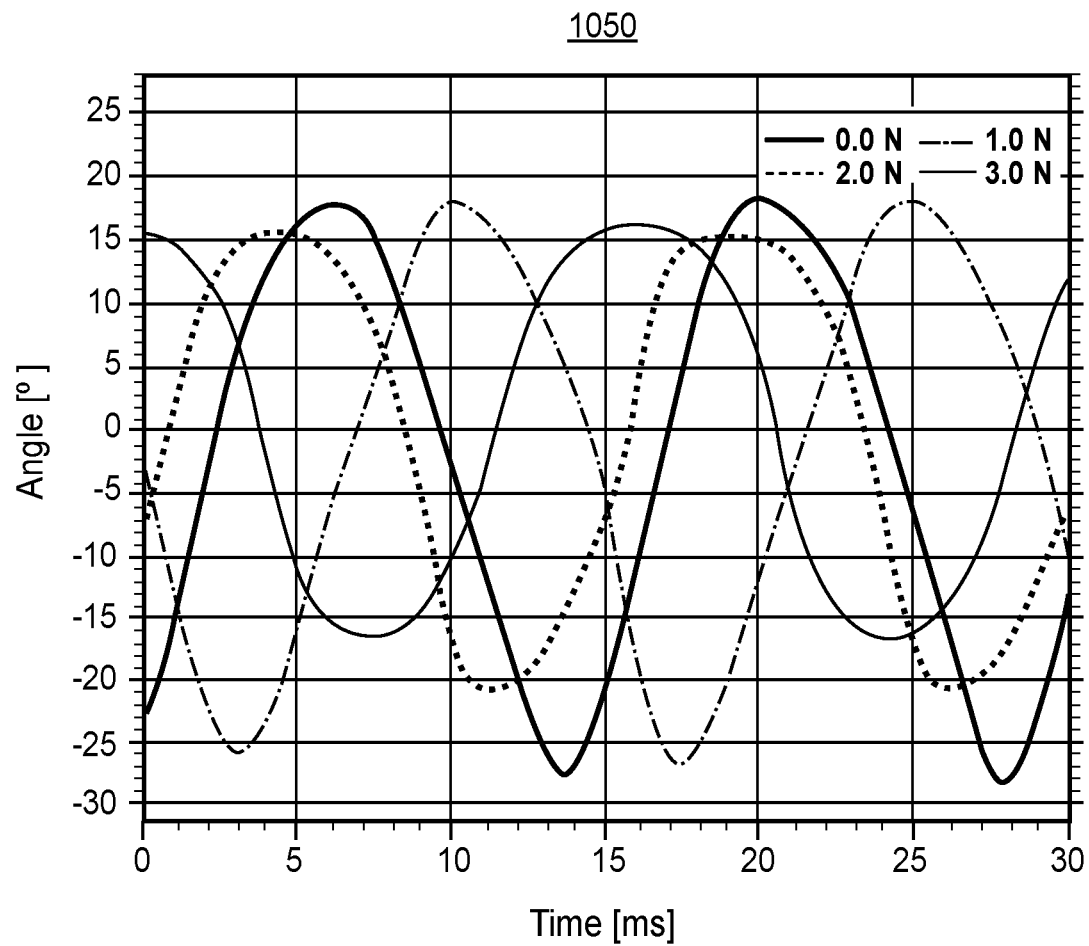
FIG. 9B illustrates a graph for an alternative electric toothbrush system depicting example angles of rotation of the bristles over time as various amounts of force are applied to the contact surface.

By contrast, as shown in the graph 1050 in FIG. 9B, in an alternative electric toothbrush system, the angle of rotation when 0 N are applied to the contact surface is about 46°. However, when 2N are applied to the contact surface the angle of rotation decreases to about 36°, and when 3N are applied to the contact surface the angle of rotation decreases even further to about 32°. Therefore, in the alternative electric toothbrush system of FIG. 9B, the applied load reduces the effective travel of the motor/gear system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

The disclosure of every document cited herein, including that of any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. An electric toothbrush comprising:
   a brush head including a plurality of angled bristles attached to the brush head at a non-perpendicular angle with respect to the brush head; and
   a handle removably attached to the brush head and including a linear motor coupled to and driving a gearing structure configured to transform a linear movement along a longitudinal axis of the linear motor into rotation of the plurality of angled bristles about an axis of rotation normal to a mounting surface of the brush head, the plurality of angled bristles being rotatable at at least one rotation frequency, clockwise and counterclockwise with respect to the brush head, wherein the at least one rotation frequency is at or above a frequency threshold,
   wherein the brush head moves toward and away from a contact surface solely via bristle-driven pulsation in a direction substantially perpendicular to the longitudinal axis and in synchronization with the rotation of the plurality of angled bristles, wherein the bristle-driven pulsation results from the rotating plurality of angled bristles contacting the contact surface.

2. The electric toothbrush of claim 1, wherein the motor is configured to drive the plurality of angled bristles to rotate clockwise during a first time interval and counterclockwise during a second time interval, wherein a time period corresponding to the at least one rotation frequency includes a combination of the first time interval and the second time interval.

3. The electric toothbrush of claim 1, wherein the brush head moves toward and away from the contact surface, wherein an amount of vibration is measured as a standard deviation of a force measured for each applied load.

4. The electric toothbrush of claim 1, wherein the brush head moves toward and away from the contact surface in synchronization with the rotation of the plurality of angled bristles by vibrating at at least one vibration frequency corresponding to the at least one rotation frequency.

5. The electric toothbrush of claim 4, wherein the at least one vibration frequency includes the rotation frequency or multiples of the rotation frequency.

6. The electric toothbrush of claim 4, wherein a vibration amplitude of the brush head increases as a load applied to the contact surface increases above a threshold amount.

7. The electric toothbrush of claim 1, wherein the at least one rotation frequency is greater than 100 Hz.

8. The electric toothbrush of claim 1, wherein the motor is configured to drive the plurality of angled bristles to rotate clockwise and counterclockwise by a predetermined angle of rotation.

9. The electric toothbrush of claim 1, wherein the electric toothbrush handle further includes a light source and a pressure sensor, wherein the light source is configured to change color in response to changes in pressure detected by the pressure sensor.

10. An electric toothbrush comprising:
    a brush head including a plurality of bristles attached to the brush head, wherein the bristles are attached to the brush head at a non-perpendicular angle with respect to the brush head; and
    a handle removably attached to the brush head and including:
    a linear motor configured to drive a gearing structure coupled to the motor, wherein the gearing structure is configured to transform a linear movement of the linear motor along a longitudinal axis into rotation of the plurality of bristles attached to the brush head, to cause the plurality of bristles rotate clockwise and counterclockwise with respect to the brush head at a predetermined rotation frequency, wherein the brush head moves toward and away from a contact surface via bristle-driven pulsation in a direction substantially perpendicular to the longitudinal axis, which movement is caused by bristles' properties selected from a group consisting of a density of the bristles, the non-perpendicular angle at which the bristles are attached to the brush head, a stiffness of the bristles, bending and buckling forces in the bristles, and any combination thereof,
    wherein, other than the bristles that cause bristle-driven pulsation, the electric toothbrush does not comprise any other mechanisms configured to provide pulsations that would move the brush head toward and away from the contact surface in the direction substantially perpendicular to the longitudinal axis.

11. The electric toothbrush of claim 10, wherein the motor is configured to drive the plurality of bristles to rotate clockwise during a first time interval and counterclockwise during a second time interval, wherein a time period corresponding to the predetermined rotation frequency includes a combination of the first time interval and the second time interval.

12. The electric toothbrush of claim 10, wherein the brush head moves toward and away from the contact surface, wherein an amount of vibration is measured as a standard deviation of a force measured for each applied load.

13. The electric toothbrush of claim 12, wherein a vibration amplitude of the brush head increases as a load applied to the contact surface increases above a threshold amount.

14. The electric toothbrush of claim 10, wherein the brush head moves toward and away from the contact surface in synchronization with the rotation of the plurality of bristles by vibrating at one or more vibration frequencies corresponding to the predetermined rotation frequency.

15. The electric toothbrush of claim 10, further comprising:
a refill including the brush head and a brush neck, the refill being removably attached to the electric toothbrush handle, wherein when the refill is attached to the electric toothbrush handle a distance between an inner surface of the refill and an outer surface of the electric toothbrush handle is less than 0.16 mm.

16. The electric toothbrush of claim 10, wherein the motor is configured to rotate the plurality of bristles clockwise and counterclockwise by a predetermined angle of rotation, and wherein the predetermined rotation frequency is greater than 100 Hz.

17. The electric toothbrush of claim 10, wherein the handle further includes a light source and a pressure sensor, wherein the light source is configured to change color in response to changes in pressure detected by the pressure sensor.

18. A method for providing bristle driven pulsation of an electric toothbrush, the method comprising:
providing the electric toothbrush comprising a brush head with a plurality of angled bristles, the toothbrush having a linear motor, a gearing structure coupled to and driven by the linear motor to transform a linear movement of the linear motor along a longitudinal axis into an oscillating rotating movement of the plurality of angled bristles at a rotation frequency which is at or above a frequency threshold, wherein the plurality of angled bristles are attached to the brush head at a non-perpendicular angle with respect to the brush head; and
bristle-driven pulsation results as the plurality of angled bristles rotate and contact a contact surface, causing the brush head to move toward and away from the contact surface in a direction substantially perpendicular to the longitudinal axis and in synchronization with the oscillating rotating movement of the plurality of angled bristles,
wherein the bristle-driven pulsation is the only cause of the brush head moving toward and away from the contact surface.

\* \* \* \* \*